(No Model.)
W. SCHEERER.
SCISSORS OR SHEARS.
No. 556,440.  Patented Mar. 17, 1896.
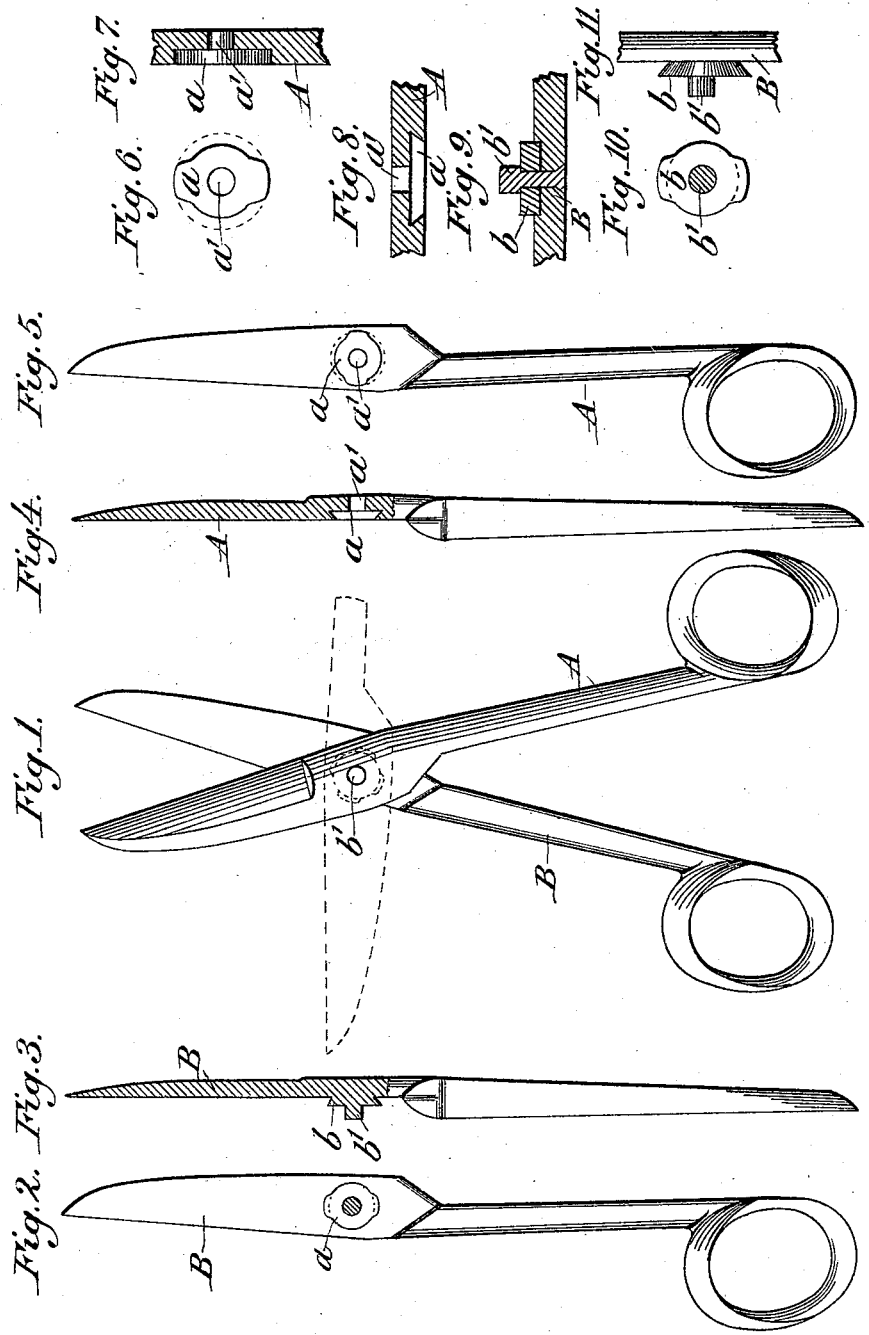
Attest:
F. H. Schott
M. C. Massie
Inventor:
Wilhelm Scheerer
by Max Georgii
Atty.

UNITED STATES PATENT OFFICE.

WILHELM SCHEERER, OF TUTTLINGEN, GERMANY.

SCISSORS OR SHEARS.

SPECIFICATION forming part of Letters Patent No. 556,440, dated March 17, 1896.

Application filed June 29, 1895. Serial No. 554,457. (No model.)

*To all whom it may concern:*

Be it known that I, WILHELM SCHEERER, of Tuttlingen, Würtemberg, Germany, have invented a new and useful Improvement in Scissors, Tongs, and the Like, of which the following is a specification.

The gist of the present invention is a shear-joint or joint for pliers and similar two-part instruments which is completely concealed and which permits the shears or pliers to be readily taken apart. For this reason it is particularly adapted to surgical shears and tongs, &c., which are required to be quickly taken apart and cleaned with punctilious accuracy. As is well known, there exist separable instruments designed for the above purpose. However, they are open to the objection that apart from their defective pivotal bearing uncleanliness is liable to gather in the joint and that the shear or tong halves are generally considerably weakened at the joint. The new shear or plier joint overcomes all these objections. It may be so constructed as to be entirely invisible from the outside and still to comprise large pivotal studs, whereby an extremely firm connection of the two shear-halves is obtained and the wear at the joint is reduced.

The accompanying drawings illustrate the new joint as applied to shears.

Figure 1 represents the shear-halves as assembled to form the shears. Figs. 2 and 3 and Figs. 4 and 5 represent the two shear-halves A and B, each in front elevation and partial longitudinal section, respectively. Figs. 6 to 11 are on an enlarged scale and represent the shear-joint proper in detail.

This shear-joint consists in a conical projection $b$ on the inner surface of the one shear-half, B, and a recess $a$ on the other shear-half, A, into which the projection $b$ accurately fits. Inasmuch as the conical projection $b$ cannot be inserted into the conical recess the said projection $b$ is flattened at two diametrically-opposite points to such an extent that its conical form disappears at these points and becomes cylindrical. In the same manner the conical or beveled flange of the recess $a$ is routed or cut away at two diametrically-opposite points in such a manner that now the outer contour of the projection $b$ exactly fits the contour of the outer face of the recess $a$. If now the two shear-halves A and B are laid upon each other so that these outer contours are coincident, the remaining conical portions of the projection $b$ will sink into the cut-away portions of the recess $a$, and if now the two shear-halves are turned with relation to each other the conical portions of the said projection will be caused to engage the remaining portions of the conical flange of the recess $a$, whereby both halves become locked together. For the purpose of cutting the conical recess $a$ a small hole $a'$ is provided at the proper point, which hole in the drawings is represented as extending entirely through the shear member. This is not absolutely necessary; but this hole or recess may be closed at the exterior, so that when the two shear halves or members are assembled nothing whatever of the shear-joint is visible. If, however, the hole extends entirely through the shear member A, the under face of the member B is provided with a corresponding pin or stud $b'$, adapted to snugly fit into the hole $a'$. The projection $b$ and the recess $a$ are flattened and cut away at such points with respect to each other that the shear members may be assembled or connected when they occupy the position indicated by the dash and dot lines in Fig. 1—*i. e.*, when the parts are about at right angles to each other.

Instead of making the projection and recess flat and conical, as shown, they may also have a curved or bulging cross-section. The projection $b$ may either be attached to the shear member B, or it may be integral therewith.

What I claim, and desire to secure by Letters Patent, is—

1. In a joint for shears, a blade having a flaring conical projection, $b$, on its inner face, in combination with a co-operating blade having a corresponding conical recess in its inner face, the projection being flattened at two opposite points, while the walls of the recess are cut away at two corresponding opposite points, substantially as set forth.

2. In a joint for shears, a blade having an integral flaring conical projection, $b$, on its inner face, in combination with a co-operating blade having a corresponding conical recess in its inner face, the projection being flattened at two opposite points, while the walls of the recess are cut away at two corresponding opposite points, substantially as set forth.

In testimony whereof I have signed this specification in the presence of two subscribing witnesses.

WILHELM SCHEERER.

Witnesses:
AUGUST B. DRAUTZ,
WM. HAHN.